US012750863B2

(12) United States Patent
Zhao

(10) Patent No.: US 12,750,863 B2
(45) Date of Patent: Sep. 29, 2026

(54) METHOD AND DEVICE FOR INDICATING MULTICAST BROADCAST SERVICE

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 291 days.

(21) Appl. No.: 18/692,867

(22) PCT Filed: Sep. 24, 2021

(86) PCT No.: PCT/CN2021/120475

§ 371 (c)(1),
(2) Date: Mar. 18, 2024

(87) PCT Pub. No.: WO2023/044812

PCT Pub. Date: Mar. 30, 2023

(65) Prior Publication Data

US 2025/0142587 A1 May 1, 2025

(51) Int. Cl.

*H04W 72/232* (2023.01)
*H04W 72/231* (2023.01)
*H04W 72/30* (2023.01)

(52) U.S. Cl.

CPC ....... *H04W 72/232* (2023.01); *H04W 72/231* (2023.01); *H04W 72/30* (2023.01)

(58) Field of Classification Search

CPC . H04W 72/232; H04W 72/231; H04W 72/30; H04W 4/06; H04W 72/23; H04L 5/0044; H04L 5/0053; Y02D 30/70

See application file for complete search history.

(56) References Cited

U.S. PATENT DOCUMENTS

2018/0167959 A1* 6/2018 Liao .................... H04W 72/121
2021/0105808 A1 4/2021 Lei et al.
2021/0194714 A1 6/2021 Kadiri et al.
2021/0250918 A1 8/2021 Liu et al.

(Continued)

FOREIGN PATENT DOCUMENTS

CN 103491643 A 1/2014
CN 109982266 A 7/2019
WO WO 2021139747 A1 7/2021

OTHER PUBLICATIONS

The First Office Action issued by the State Intellectual Property Office of People's Republic of China on Feb. 28, 2025, in corresponding Application No. CN 202180002966.7, 17 pages.

(Continued)

*Primary Examiner* — Yu-Wen Chang

(74) *Attorney, Agent, or Firm* — Finnegan, Henderson, Farabow, Garrett & Dunner, L.L.P.

(57) ABSTRACT

A method for indicating a multicast broadcast service (MBS) is performed by a terminal device. The method includes: acquiring downlink control information (DCI), and determining subgroup indication information according to the DCI; and determining a physical downlink shared channel (PDSCH) scheduled by the DCI that needs to be parsed according to at least one subgroup identifier (ID) corresponding to the terminal device and the subgroup indication information, wherein the PDSCH is configured to carry the MBS.

14 Claims, 6 Drawing Sheets

(56) References Cited

U.S. PATENT DOCUMENTS

| | | | | |
|---|---|---|---|---|
| 2022/0225384 | A1* | 7/2022 | Takeda | H04W 72/04 |
| 2022/0272662 | A1* | 8/2022 | Kim | H04W 72/044 |
| 2024/0137183 | A1* | 4/2024 | Lei | H04L 1/1896 |
| 2025/0203623 | A1* | 6/2025 | Babaei | H04W 76/40 |

OTHER PUBLICATIONS

International Search Report and Written Opinion of International Application No. PCT/CN2021/120475, dated Jun. 1, 2022, 13 pages.

* cited by examiner

METHOD AND DEVICE FOR INDICATING MULTICAST BROADCAST SERVICE

CROSS-REFERENCE TO RELATED APPLICATIONS

This application is the US national phase application of International Application No. PCT/CN2021/120475, filed on Sep. 24, 2021, the entire contents of which are incorporated herein by reference.

TECHNICAL FIELD

The present disclosure relates to a field of communication technologies, and particularly to a method and a device for indicating a multicast broadcast service (MBS).

BACKGROUND

In Release 17 (R17), a network device may group a multicast broadcast service (MBS) terminal via a semi-static signaling, and send service information to a terminal device in a corresponding group via downlink control information (DCI).

Services that terminal devices belonging to the same MBS group are expected to receive may not be same. However, since the network device groups the MBS terminal via the semi-static signaling, the terminal device needs to be fixed in the MBS group configured by the semi-static signaling for a long time. Therefore, when the network device sends service information to the terminal devices belonging to the same MBS group, all terminal devices in the MBS group need to parse the received service information, so that the terminal devices not expecting the service information perform unnecessary parsing, which increases a power consumption of the terminal, with low flexibility.

SUMMARY

According to a first aspect of embodiments of the present disclosure, there is provided a method for indicating a multicast broadcast service (MBS). The method is performed by a terminal device, and includes:

- acquiring a DCI, and determining subgroup indication information according to the DCI; and
- determining a PDSCH scheduled by the DCI that needs to be parsed according to at least one subgroup ID corresponding to the terminal device and the subgroup indication information, in which the PDSCH is configured to carry the MBS.

According to a second aspect of embodiments of the present disclosure, there is provided a method for indicating a multicast broadcast service (MBS). The method is performed by a network device, and includes:

- sending subgroup indication information to a terminal device via a DCI, in which the subgroup indication information is configured to indicate to the terminal device a subgroup corresponding to a PDSCH scheduled by the DCI.

According to a third aspect of embodiments of the present disclosure, there is provided a terminal device. The device includes:

- a transceiver;
- a memory; and
- a processor, respectively connected to the transceiver and the memory.

The processor is configured to:

- acquire a DCI, and determine subgroup indication information according to the DCI; and
- determine a PDSCH scheduled by the DCI that needs to be parsed according to at least one subgroup ID corresponding to the terminal device and the subgroup indication information, in which the PDSCH is configured to carry the MBS.

BRIEF DESCRIPTION OF THE DRAWINGS

The following is a brief description of the accompanying drawings.

DETAILED DESCRIPTION

Figure 1A:
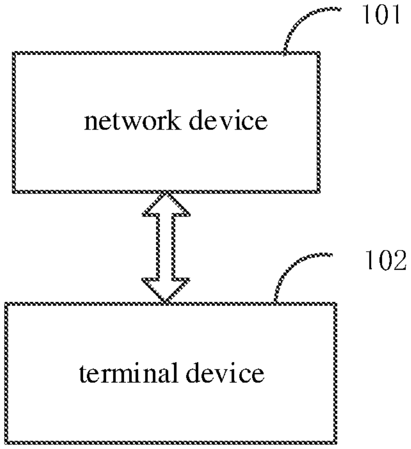
FIG. 1A is a diagram illustrating an architecture of a communication system according to embodiments of the present disclosure.

For convenience of understanding, terms involved in the present disclosure are introduced first.

1. Multicast Broadcast Service (MBS)

The MBS is an important function of a wireless communication system defined according to an IEEE802.16e protocol. The MBS is divided into two cases, a single base station access and a multi-base station access. The single base station access refers to a multicast broadcast service in one base station, and the multi-base station access refers to that all terminals registering multicast broadcast contents on a network level may receive multicast broadcast services synchronously transmitted by all base stations in a multicast broadcast service area on a downlink.

2. Downlink Control Information (DCI)

The DCI is carried by a physical downlink control channel (PDCCH). The DCI may include uplink and downlink resource allocation, hybrid automatic repeat request (HARQ) information, power control, etc. The PDCCH is a physical channel for carrying downlink scheduling information.

3. Scrambling

The scrambling is a method for processing a digital signal that performs an XOR operation using a scrambling code and an original signal to obtain a new signal. Generally, uplink physical channel scrambling is configured to distinguish different terminal devices, and downlink scrambling can distinguish a cell and a channel. The scrambling code may be configured to scramble and descramble an original signal. For example, the scrambling code may scramble the DCI, or may also be referred to as scrambling the PDCCH. Scrambling the DCI may specifically refer to scrambling a cyclic redundancy check (CRC) field of the DCI. Correspondingly, the terminal device descrambles received DCI, and specifically, the terminal device descrambles the CRC field of the DCI using a corresponding type of scrambling code to determine a format or a type of the DCI.

The scrambling code may include but not limited to a cell radio network temporary identifier (C-RNTI), a temporary cell radio network temporary identifier (TC-RNTI), a group radio network temporary identifier (G-RNTI) and a random access radio network temporary identifier (RA-RNTI).

a) C-RNTI and TC-RNTI

If the terminal device is in a radio resource control connected (RRC-connected) state, it indicates that the terminal device has been allocated to the C-RNTI, and the terminal device needs to carry the C-RNTI when initiating a random access request to the network device. If the terminal device is in an RRC idle state or an RRC inactive state, it indicates that the terminal device has not been allocated to the C-RNTI. If the terminal device requests an RRC connection, the network device may allocate a temporary C-RNTI, denoted as TC-RNTI, to the terminal device in subsequent response information. The TC-RNTI may be converted into the C-RNTI after the terminal device successfully randomly accesses.

b) G-RNTI

In the MBS, the network device schedules the PDSCH scrambled by the G-RNTI via the DCI scrambled by the G-RNTI, and the terminal device parses the PDSCH carrying MBS data according to relevant scheduling information carried by the DCI scrambled by the G-RNTI.

In order to understand the method for indicating the MBS in embodiments of the present disclosure better, a communication system to which embodiments of the present disclosure are applicable is described below.

Referring to FIG. 1A, FIG. 1A is a diagram illustrating an architecture of a communication system according to embodiments of the present disclosure. The communication system may include, but is not limited to, one network device and one terminal device. A number and a form of the devices shown in FIG. 1A are only for example and do not constitute a limitation to the embodiments of the present disclosure, and two or more network devices and two or more terminal devices may be included in practical applications. The communication system 100 as illustrated in FIG. 1A includes one network device 101 and one terminal device 102 for example.

It needs to be noted that the technical solution in the embodiments of the present disclosure is applicable to various communication systems. For example, a long term evolution (LTE) system, a 5th generation (5G) mobile communication system, a 5G new radio (NR) system or other future new mobile communication systems. It should be noted that a sidelink in the embodiments of the present disclosure may be referred to as a side link or a direct link.

The network device 101 in the embodiments of the present disclosure is an entity for transmitting or receiving a signal at a network side. For example, the network device 101 may be an evolved NodeB (eNB), a transmission reception point (TRP), a next generation NodeB (gNB) in a NR system, a base station in other future mobile communication systems, or an access node in a wireless fidelity (WiFi) system. A specific technology and a specific device form adopted by the network device are not limited in the embodiments of the present disclosure. The network device according to the embodiments of the present disclosure may consist of a central unit (CU) and a distributed unit (DU). The CU may also be referred to as a control unit, and a network device such as a protocol layer of a base station, may be split by using a structure of the CU-DU, functions of a part of the protocol layer are placed in the CU for centralized control, and functions of a remaining part or all of the protocol layer are distributed in the DU, and the DU is centrally controlled by the CU.

The terminal device 102 in the embodiments of the present disclosure is an entity for receiving or transmitting a signal at a user side, for example, a mobile phone. The terminal device may be referred to as a terminal, a user equipment (UE), a mobile station (MS), a mobile terminal (MT), etc. The terminal device may be an automobile with a communication function, a smart automobile, a mobile phone, a wearable device, a tablet computer (Pad), a computer with a wireless transceiving function, a virtual reality (VR) terminal device, an augmented reality (AR) terminal device, a wireless terminal device in industrial control, a wireless terminal device in self-driving, a wireless terminal device in a remote medical surgery, a wireless terminal device in a smart grid, a wireless terminal device in transportation safety, a wireless terminal device in a smart home, etc. A specific technology adopted by the terminal device and a specific device form adopted by the terminal device are not limited in the embodiments of the present disclosure.

There are 4 kinds of sidelink transmission modes in a sidelink communication. A sidelink transmission mode 1 and a sidelink transmission mode 2 are configured for a device-to-device (D2D) communication of the terminal device. A sidelink transmission mode 3 and a sidelink transmission mode 4 are configured for a V2X communication. When the sidelink transmission mode 3 is adopted, resource allocation is scheduled by the network device 101. Specifically, the network device 101 may send resource allocation information to the terminal device 102, and the terminal device 102 allocates resources to another terminal device, so that this terminal device may send information to the network device 101 via the allocated resources. In the V2X communication, a terminal device with a good signal or high reliability may be taken as the terminal device 102. The terminal device in the embodiments of the present disclosure may refer to the terminal device 102, and a second terminal device may refer to another terminal device.

It may be understood that, the communication system described in the embodiments of the present disclosure are intended to explain technical solutions of the embodiments of the present disclosure more clearly, and does not constitute a limitation to the technical solutions provided by the embodiments of the present disclosure. Those skilled in the art know that, with evolution of a system architecture and emergence of a new business scenario, the technical solutions provided in the embodiments of the present disclosure are equally applied to similar technical problems.

The method and the apparatus for indicating the MBS in the present disclosure are described in combination with attached drawings.

Figure 1B:
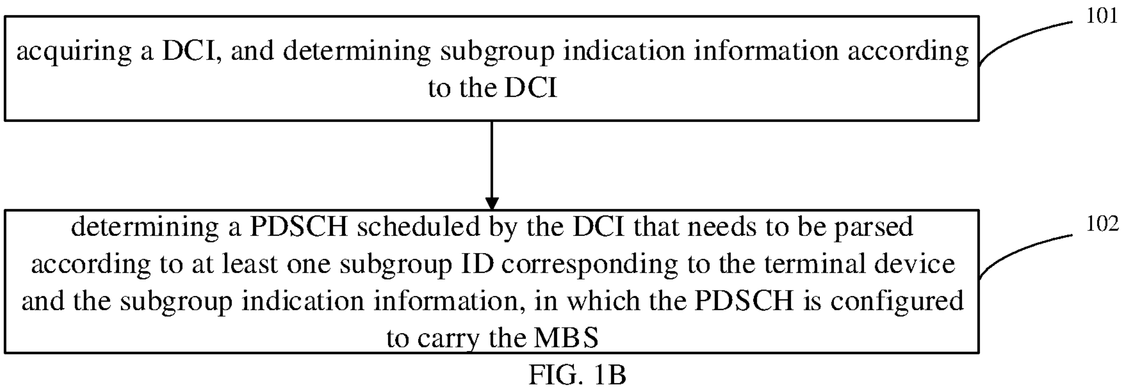
FIG. 1B is a flowchart illustrating a method for indicating a multicast broadcast service (MBS) according to an embodiment of the present disclosure.

FIG. 1B is a flowchart illustrating a method for indicating a multicast broadcast service (MBS) according to an embodiment of the present disclosure, the method is applicable to a terminal device. As illustrated in FIG. 1B, the method for indicating the MBS may include following steps.

At step 101, downlink control information (DCI) is acquired, and subgroup indication information is determined according to the DCI.

In an embodiment of the present disclosure, the terminal device further needs to determine at least one subgroup identifier (ID) corresponding to the terminal device before step 101.

And in an embodiment of the present disclosure, the method that the terminal device determines at least one subgroup ID corresponding to it may include: receiving a radio resource control (RRC) signaling from a network device, in which the RRC signaling carries the at least one subgroup ID corresponding to the terminal device. The terminal device determines the at least one subgroup ID corresponding to the terminal device according to the RRC signaling.

It needs to be noted that, in an embodiment of the present disclosure, before the network device configures for the terminal device the at least one subgroup ID corresponding to the terminal device via the RRC signaling, the network device may perform MBS grouping on the terminal device in advance, each MBS group includes at least one terminal, and then the MBS group is divided into different subgroups, and a subgroup ID is allocated for each of the subgroups.

Specifically, in an embodiment of the present disclosure, the method that the network device performs the MBS grouping on the terminal device may include: configuring by the network device at least one G-RNTI for the terminal device. The at least one G-RNTI is configured to identify an MBS group to which terminal device belongs.

For example, in an embodiment of the present disclosure, assuming that there are 4 terminal devices, which are respectively a UE #1, a UE #2, a UE #3 and a UE #4, and assuming that G-RNTIs configured by the network device for the UE #1, UE #2, UE #3 and UE #4 are same, the UE #1, the UE #2, the UE #3 and the UE #4 may be grouped into one MBS group. Then, the terminals in the MBS group may be divided to obtain a plurality of subgroups. For example, the UE #1, the UE #2, the UE #3 and the UE #4 may be determined as one subgroup, the UE #1, the UE #2 and the UE #4 may be determined as one subgroup, the UE #1, the UE #2, the UE #3 may be determined as one subgroup, and the UE #1 may be determined as one subgroup. Therefore, the MBS group including the UE #1, the UE #2, the UE #3 and the UE #4 may correspond to four subgroups, which are respectively the subgroup of UE #1, UE #2, UE #3, and UE #4, the subgroup of UE #1, UE #2, and UE #4, the subgroup of UE #1, UE #2, and UE #3, and the subgroup of UE #1. Then, the network device may allocate a subgroup ID for the obtained four subgroups. Table 1 is a table illustrating a correspondence relationship between a subgroup ID and a terminal device included in a subgroup provided in the embodiment of the present disclosure.

TABLE 1

| Subgroup ID | Terminal device included in the subgroup |
|---|---|
| #1 | {UE#1, UE#2, UE#3, UE#4} |
| #2 | {UE#1, UE#2, UE#4} |
| #3 | {UE#1, UE#2, UE#3} |
| #4 | {UE#1} |

As shown in Table 1, a subgroup ID of the subgroup including the UE #1, the UE #2, the UE #3 and the UE #4 is #1; a subgroup ID of the subgroup including the UE #1, the UE #2 and the UE #4 is #2.

It can be seen from the above that in an embodiment of the present disclosure, after the network device performs the MBS grouping on each terminal device and allocates a subgroup ID for each MBS subgroup, at least one subgroup ID corresponding to the terminal device may be sent to the terminal device via the RRC signaling.

Further, in an embodiment of the present disclosure, the DCI may be carried by the PDCCH. Subgroup indication information may be included in the DCI, and specifically may be configured to indicate the subgroup ID, so that the terminal device may determine a target subgroup ID corresponding to the DCI signaling based on the subgroup indication information, and determine whether to parse the DCI signaling by determining whether the terminal device belongs to the target subgroup ID.

It needs to be noted that, in an embodiment of the present disclosure, the subgroup indication information may include L bits, where L is a positive integer. And there is a correspondence relationship between the L bits and the subgroup ID. When values corresponding to states of the L bits are different, it may indicate different subgroup IDs.

For example, assuming L=2, that is, the subgroup indication information includes 2 bits, Table 2 is a table illustrating a correspondence relationship between subgroup ID information and a subgroup ID provided in the embodiment of the present disclosure.

TABLE 2

| Subgroup indication information | Subgroup ID |
|---|---|
| 00 | #1 |
| 01 | #2 |
| 10 | #3 |
| 11 | #4 |

As shown in Table 2, when the subgroup indication information carried in the DCI is 00, a target subgroup ID corresponding to the subgroup indication information is #1. The subgroup with the target subgroup ID #1 includes UE #1, UE #2, UE #3, and UE #4 (see table 1 specifically). When the subgroup indication information carried in the DCI is 11, a target subgroup ID corresponding to the subgroup indication information is #4. The subgroup with the target subgroup ID #4 includes UE #1.

Further, it needs to be noted that, in an embodiment of the present disclosure, the subgroup indication information specifically may be located in at least one of:

a newly added information field in the DCI;

a refarmed information field in the DCI; or a frozen bit included in coded bits of the DCI.

It needs to be noted that, in an embodiment of the present disclosure, the refarmed information field in the DCI specifically may be other information fields in the DCI (for example, a DCI format identifier field carried in the DCI, and/or, a transmission power control (TPC) field). And, in an embodiment of the present disclosure, the refarmed other information fields may be pre-agreed by a network device and a terminal device.

At step 102, a physical downlink shared channel (PDSCH) scheduled by the DCI that needs to be parsed is determined according to at least one subgroup ID corresponding to the terminal device and the subgroup indication information. The PDSCH is configured to carry the MBS.

In an embodiment of the present disclosure, the DCI may schedule one or more PDSCHs. Based on this, the one or more PDSCHs scheduled by the DCI that need to be parsed may be determined according to the at least one subgroup ID corresponding to the terminal device and the subgroup indication information. The one or more PDSCHs may be configured to carry the MBS.

In an embodiment of the present disclosure, the method that the terminal device determines the PDSCH scheduled by DCI that needs to be parsed according to the at least one subgroup ID and the subgroup indication information may include:

- determining a target subgroup ID according to the subgroup indication information included in the DCI (the method for determining the target subgroup ID according to the subgroup indication information may refer to the above content and Table 2); and when the terminal device belongs to a subgroup corresponding to the target subgroup ID, determining that the PDSCH scheduled by the DCI needs to be parsed according to the scheduling information in the DCI.

Further, it needs to be noted that, in an embodiment of the present disclosure, the network device may scramble the PDSCH based on a scrambling sequence before transmitting the PDSCH. Based on this, in an embodiment of the present disclosure, when parsing the PDSCH scheduled by the DCI according to the scheduling information in the DCI, the terminal device needs to descramble the PDSCH based on the scrambling sequence first, and then parses the descrambled PDSCH.

In an embodiment of the present disclosure, the scrambling sequence specifically may be determined by the terminal device according to the subgroup indication information carried in the DCI.

Specifically, in an embodiment of the present disclosure, the network device may configure one scrambling ID for each subgroup ID, and each scrambling ID may generate one scrambling sequence correspondingly. Based on this, the terminal device may determine a target subgroup ID based on the subgroup indication information after acquiring the subgroup indication information included in the DCI, and determine a scrambling ID corresponding to the target subgroup ID based on a correspondence relationship between the subgroup ID and the scrambling ID, further to generate a corresponding scrambling sequence based on the determined scrambling ID, and descramble the PDSCH based on the scrambling sequence.

Table 3 is a table illustrating a correspondence relationship between a subgroup ID and a scrambling ID provided in the embodiment of the present disclosure.

TABLE 3

| Subgroup ID | Scrambling ID |
|---|---|
| #1 | ID#1 |
| #2 | ID#2 |
| #3 | ID#3 |
| #4 | ID#4 |

As shown in Table 3, a scrambling ID corresponding to a subgroup ID #1 is ID #1; and a scrambling ID corresponding to a subgroup ID #2 is ID #2.

In another embodiment of the present disclosure, the scrambling sequence specifically may be determined by the terminal device according to the RRC signaling sent by the network device.

Specifically, in an embodiment of the present disclosure, the network device may send the RRC signaling to the terminal device. The RRC signaling carries a scrambling ID used for the network device when scrambling the PDSCH. Then, the terminal device may generate a scrambling sequence based on the scrambling ID, and further to descramble the PDSCH based on the generated scrambling sequence.

Therefore, in the embodiment of the present disclosure, by introducing the scrambling ID and the scrambling sequence, only the terminal device belonging to the target subgroup can correctly receive the PDSCH, and a terminal device not belonging to the target subgroup cannot correctly receive the PDSCH, which plays a function of rejecting a non-target terminal, and increases transmission security.

In summary, in the method for indicating the MBS provided in the embodiments of the present disclosure, the terminal device can determine at least one subgroup ID corresponding to it, and acquire a DCI sent by the network device, determine the subgroup indication information according to the DCI, and finally, determine the PDSCH scheduled by the DCI that needs to be parsed according to the at least one subgroup ID and the subgroup indication information, in which the PDSCH is configured to carry the MBS. Therefore, in the embodiments of the present disclosure, the plurality of subgroup IDs are allocated for the terminal device, so that the terminal device belongs to different subgroups, which enhances flexibility of grouping of the terminal device in the MBS. And, different subgroup indication information is acquired via the DCI, and the PDSCH scheduled by the DCI that needs to be parsed is determined, which enhances flexibility of performing the MBS, and reduces a power consumption of the terminal device.

Figure 2:
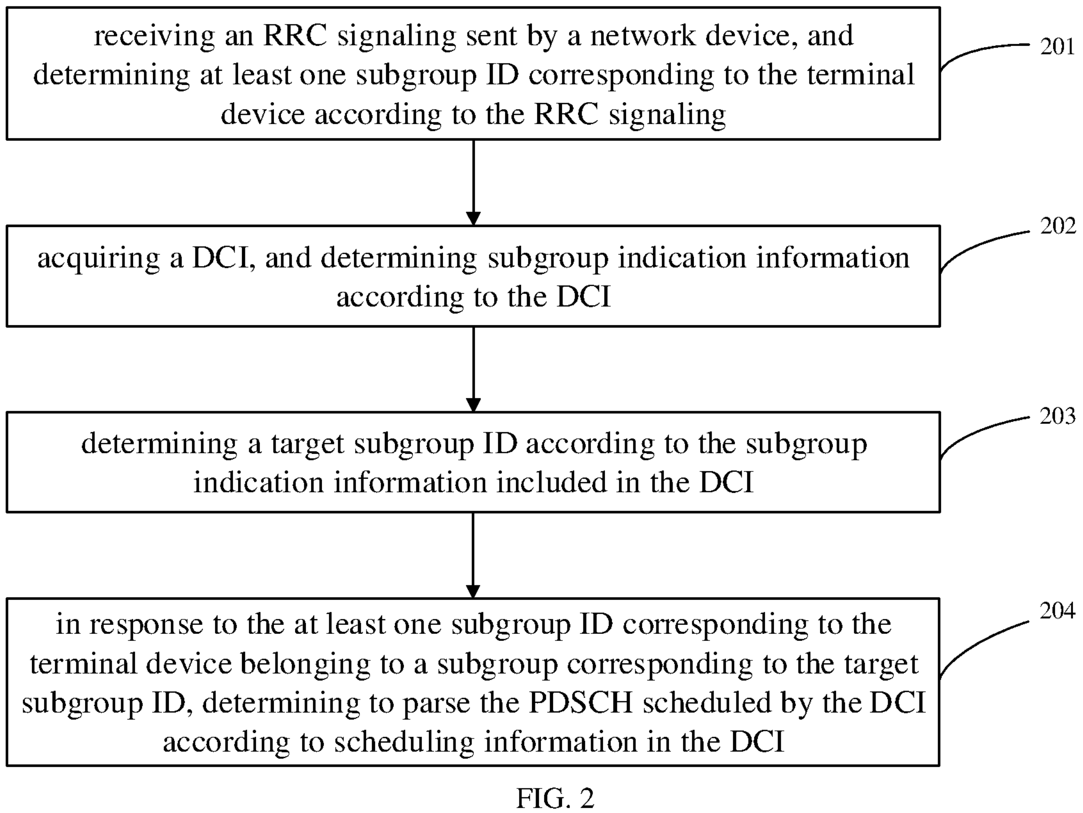
FIG. 2 is a flowchart illustrating a method for indicating a multicast broadcast service (MBS) according to another embodiment of the present disclosure.

FIG. 2 is a flowchart illustrating a method for indicating a multicast broadcast service (MBS) according to another embodiment of the present disclosure, the method is applicable to a terminal device. As illustrated in FIG. 2, the method for indicating the MBS may include following steps.

At step 201, an RRC signaling sent by a network device is received, and at least one subgroup ID corresponding to the terminal device is determined according to the RRC signaling.

At step 202, a DCI is acquired, and subgroup indication information is determined according to the DCI.

At step 203, a target subgroup ID is determined according to the subgroup indication information included in the DCI.

At step 204, in response to the terminal device belonging to a subgroup corresponding to the target subgroup ID, it is determined to parse the PDSCH scheduled by the DCI according to scheduling information in the DCI.

Descriptions of steps 201 to 204 may refer to descriptions of the above embodiments, which will not be repeated here.

In summary, in the method for indicating the MBS provided in the embodiments of the present disclosure, the terminal device can determine at least one subgroup ID corresponding to it, and acquire the DCI sent by the network device, determine the subgroup indication information according to the DCI, and finally determine the PDSCH scheduled by the DCI that needs to be parsed according to the at least one subgroup ID and the subgroup indication information, in which the PDSCH is configured to carry the MBS. Therefore, in the embodiments of the present disclosure, the plurality of subgroup IDs are allocated for the terminal device, so that the terminal device belongs to different subgroups, which enhances flexibility of grouping of the terminal device in the MBS. And, different subgroup indication information is acquired via the DCI, and the PDSCH scheduled by the DCI that needs to be parsed is determined, which enhances flexibility of performing the MBS, and reduces a power consumption of the terminal device.

Figure 3:
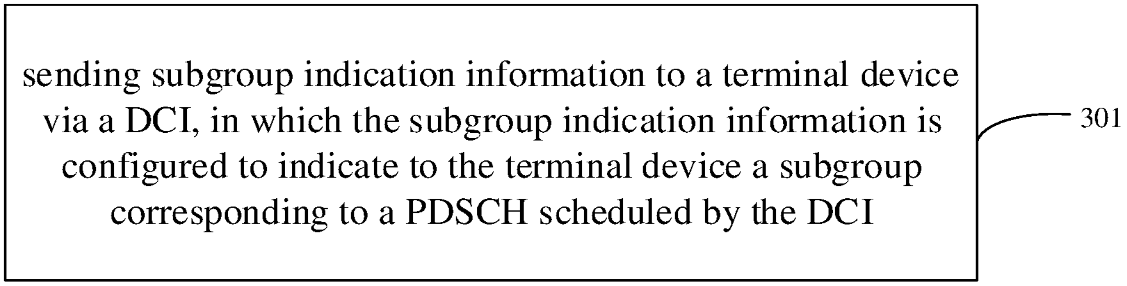
FIG. 3 is a flowchart illustrating a method for indicating a multicast broadcast service (MBS) according to another embodiment of the present disclosure.

FIG. 3 is a flowchart illustrating a method for indicating a multicast broadcast service (MBS) according to another embodiment of the present disclosure, the method is applicable to a network device. As illustrated in FIG. 3, the method for indicating the MBS may include following steps.

At step 301, subgroup indication information is sent to a terminal device via a DCI. The subgroup indication information is configured to indicate to the terminal device a subgroup corresponding to a PDSCH scheduled by the DCI.

Descriptions of step 301 may refer to descriptions of the above embodiments, which will not be repeated here.

In summary, in the method for indicating the MBS provided in the embodiments of the present disclosure, the terminal device can determine at least one subgroup ID corresponding to it, and acquire the DCI sent by the network device, determine the subgroup indication information according to the DCI, and finally determine the PDSCH scheduled by the DCI that needs to be parsed according to the at least one subgroup ID and the subgroup indication information, in which the PDSCH is configured to carry the MBS. Therefore, in the embodiments of the present disclosure, the plurality of subgroup IDs are allocated for the terminal device, so that the terminal device belongs to different subgroups, which enhances flexibility of grouping of the terminal device in the MBS. And, different subgroup indication information is acquired via the DCI, and the PDSCH scheduled by the DCI that needs to be parsed is determined, which enhances flexibility of performing the MBS, and reduces a power consumption of the terminal device.

Figure 4:
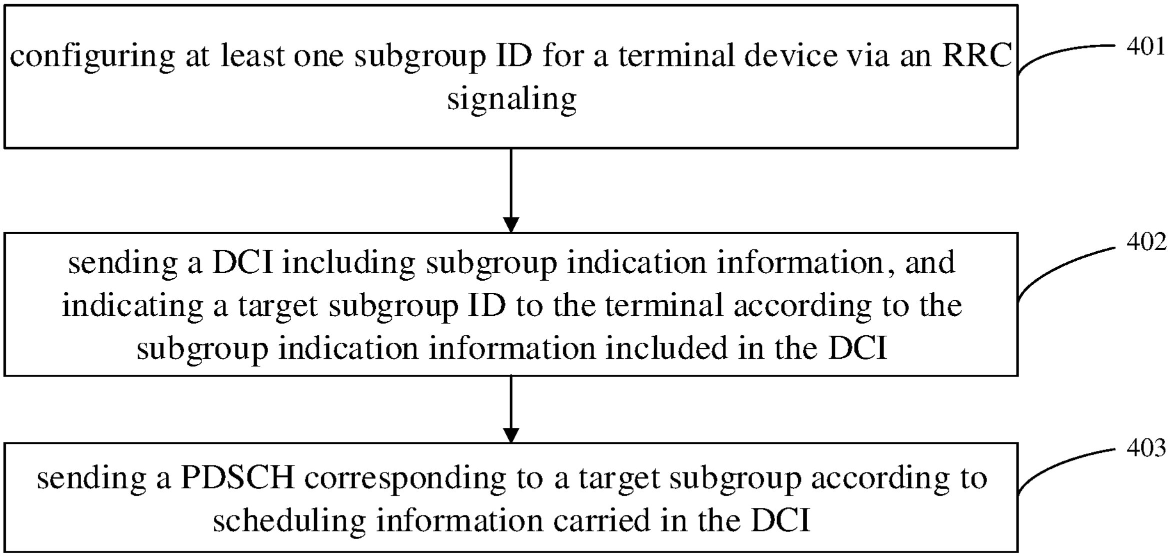
FIG. 4 is a flowchart illustrating a method for indicating a multicast broadcast service (MBS) according to another embodiment of the present disclosure.

FIG. 4 is a flowchart illustrating a method for indicating a multicast broadcast service (MBS) according to another embodiment of the present disclosure, the method is applicable to a network device. As illustrated in FIG. 4, the method for indicating the MBS may include following steps.

At step 401, at least one subgroup ID is configured for the terminal device via an RRC signaling.

At step 402, DCI including the subgroup indication information is sent, and a target subgroup ID is indicated to the terminal according to the subgroup indication information included in the DCI.

At step 403, a PDSCH corresponding to a target subgroup is sent according to scheduling information carried in the DCI.

Descriptions of steps 401 to 403 may refer to descriptions of the above embodiments, which will not be repeated here.

In addition, it needs to be noted that, in an embodiment of the present disclosure, the network device may further configure a scrambling ID for the PDSCH corresponding to the subgroup, and may further generate a scrambling sequence based on the scrambling ID corresponding to the PDSCH of the target subgroup before sending the PDSCH corresponding to the target subgroup, and send the PDSCH corresponding to the target subgroup after scrambling the PDSCH corresponding to the target subgroup based on the scrambling sequence.

And, in an embodiment of the present disclosure, in order to ensure the target terminal device in the target subgroup may descramble the scrambled PDSCH successfully, the network device may further configure the scrambling ID used for the PDSCH corresponding to the target subgroup for the terminal device via the RRC signaling, so that the terminal device may successfully descramble the received PDSCH based on the scrambling ID configured by the RRC signaling.

Descriptions of the scrambling ID and the scrambling sequence may refer to descriptions of the above embodiments, which will not be repeated here.

In summary, in the method for indicating the MBS provided in the embodiments of the present disclosure, the terminal device can determine at least one subgroup ID corresponding to it, and acquire the DCI sent by the network device, determine the subgroup indication information according to the DCI, and finally determine the PDSCH scheduled by the DCI that needs to be parsed according to the at least one subgroup ID and the subgroup indication information, in which the PDSCH is configured to carry the MBS. Therefore, in the embodiments of the present disclosure, the plurality of subgroup IDs are allocated for the terminal device, so that the terminal device belongs to different subgroups, which enhances flexibility of grouping of the terminal device in the MBS. And, different subgroup indication information is acquired via the DCI, and the PDSCH scheduled by the DCI that needs to be parsed is determined, which enhances flexibility of performing the MBS, and reduces a power consumption of the terminal device.

Figure 5:
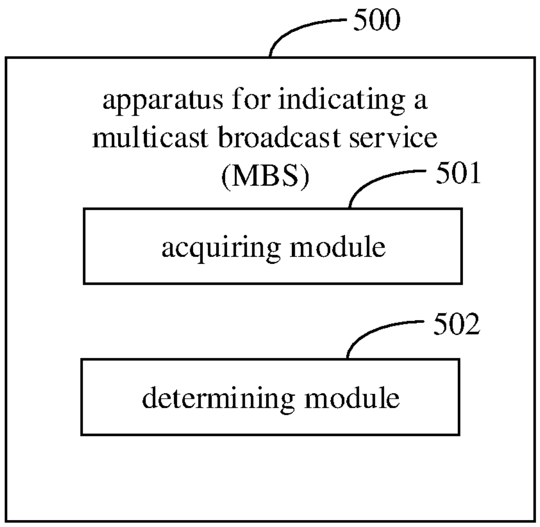
FIG. 5 is a structural diagram illustrating an apparatus for indicating a multicast broadcast service (MBS) according to an embodiment of the present disclosure.

FIG. 5 is a structural diagram illustrating an apparatus for indicating a multicast broadcast service (MBS) according to an embodiment of the present disclosure. As illustrated in FIG. 5, the apparatus 500 may include:

- an acquiring module 501, configured to acquire a DCI, and determine subgroup indication information according to the DCI; and
- a determining module 502, configured to determine a PDSCH scheduled by the DCI that needs to be parsed according to at least one subgroup ID corresponding to the terminal device and the subgroup indication information. The PDSCH is configured to carry the MBS.

In summary, in the apparatus for indicating the MBS provided in the embodiment of the present disclosure, the terminal device can determine at least one subgroup ID corresponding to it, and acquire the DCI sent by the network device, determine the subgroup indication information according to the DCI, and finally determine the PDSCH scheduled by the DCI that needs to be parsed according to the at least one subgroup ID and the subgroup indication information, in which the PDSCH is configured to carry the MBS. Therefore, in the embodiments of the present disclosure, the plurality of subgroup IDs are allocated for the terminal device, so that the terminal device belongs to different subgroups, which enhances flexibility of grouping of the terminal device in the MBS. And, different subgroup indication information is acquired via the DCI, and the PDSCH scheduled by the DCI that needs to be parsed is determined, which enhances flexibility of performing the MBS, and reduces a power consumption of the terminal device.

In an embodiment of the present disclosure, the terminal device has at least one G-RNTI. The at least one G-RNTI is configured to identify an MBS group to which the terminal device belongs.

Further, in another embodiment of the present disclosure, the above apparatus is further configured to:

- receive an RRC signaling sent by a network device, and acquire at least one subgroup ID corresponding to the terminal device according to the RRC signaling.

Further, in another embodiment of the present disclosure, the DCI is carried by a physical downlink control channel (PDCCH), and the DCI includes the subgroup indication information.

Further, in another embodiment of the present disclosure, the subgroup indication information is located in at least one of:

- a newly added information field in the DCI;
- a refarmed information field in the DCI; or
- a frozen bit included in coded bits of the DCI.

Further, in another embodiment of the present disclosure, the above determining module 502 is further configured to:

receive a DCI including the subgroup indication information, and determine a target subgroup ID according to the subgroup indication information included in the DCI; and in response to the terminal device belonging to a target subgroup corresponding to the target subgroup ID, determine to parse the PDSCH scheduled by the DCI according to the scheduling information in the DCI.

Further, in another embodiment of the present disclosure, the above apparatus is further configured to:

determine a scrambling sequence used for the PDSCH scheduled by the DCI according to the subgroup indication information carried in the DCI.

Further, in another embodiment of the present disclosure, the above apparatus is further configured to:

determine a scrambling ID used for scrambling the PDSCH via an RRC signaling sent by the network device, and determine a scrambling sequence according to the scrambling ID.

Figure 6:
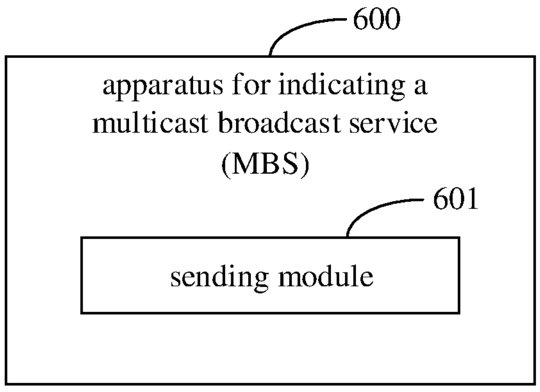
FIG. 6 is a structural diagram illustrating an apparatus for indicating a multicast broadcast service (MBS) according to another embodiment of the present disclosure.

FIG. 6 is a structural diagram illustrating an apparatus for indicating a multicast broadcast service (MBS) according to another embodiment of the present disclosure. As illustrated in FIG. 6, the apparatus 600 may include:

a sending module 601, sending subgroup indication information to a terminal device via a DCI. The subgroup indication information is configured to indicate to the terminal device a subgroup corresponding to a PDSCH scheduled by the DCI.

In summary, in the apparatus for indicating the MBS provided in the embodiment of the present disclosure, the terminal device can determine at least one subgroup ID corresponding to it, and acquire the DCI sent by the network device, determine the subgroup indication information according to the DCI, and finally determine the PDSCH scheduled by the DCI that needs to be parsed according to the at least one subgroup ID and the subgroup indication information, in which the PDSCH is configured to carry the MBS. Therefore, in the embodiments of the present disclosure, the plurality of subgroup IDs are allocated for the terminal device, so that the terminal device belongs to different subgroups, which enhances flexibility of grouping of the terminal device in the MBS. And, different subgroup indication information is acquired via the DCI, and the PDSCH scheduled by the DCI that needs to be parsed is determined, which enhances flexibility of performing the MBS, and reduces a power consumption of the terminal device.

In an embodiment of the present disclosure, the above apparatus is further configured to:

configure at least one G-RNTI for the terminal device via an RRC signaling. The at least one G-RNTI is configured to identify an MBS group to which the terminal device belongs.

Further, in another embodiment of the present disclosure, the above apparatus is further configured to:

configure at least one subgroup ID for the terminal device via the RRC signaling.

Further, in another embodiment of the present disclosure, the subgroup indication information is carried in at least one of:

a newly added information field in the DCI;

a refarmed information field in the DCI; or a frozen bit included in coded bits of the DCI.

Further, in another embodiment of the present disclosure, the above sending module 602 is further configured to:

send a DCI including the subgroup indication information, and indicate a target subgroup ID to the terminal according to the subgroup indication information included in the DCI; and send a PDSCH corresponding to a target subgroup according to scheduling information carried in the DCI.

Further, in another embodiment of the present disclosure, the above apparatus is further configured to:

configure a scrambling ID for the PDSCH corresponding to the subgroup.

Further, in another embodiment of the present disclosure, the above apparatus is further configured to:

configure a scrambling ID used for the PDSCH corresponding to the subgroup for the terminal device via an RRC signaling, and generate a scrambling sequence according to the scrambling ID to scramble the PDSCH.

A computer storage medium storing an executable program is provided in embodiments of the present disclosure. When the executable program is executed by a processor, the method as illustrated in any one of FIG. 1B, 2, 3 or 4 is implemented.

In order to implement the above embodiments, a computer program product including a computer program is further provided in the present disclosure. When the computer program is executed by a processor, the method as illustrated in any one of FIG. 1B, 2, 3, or 4 is implemented.

In addition, in order to implement the above embodiments, a computer program is further provided in the present disclosure. When the program is executed by a processor, the method as illustrated in any one of FIG. 1B, 2, 3, or 4 is implemented.

Figure 7:
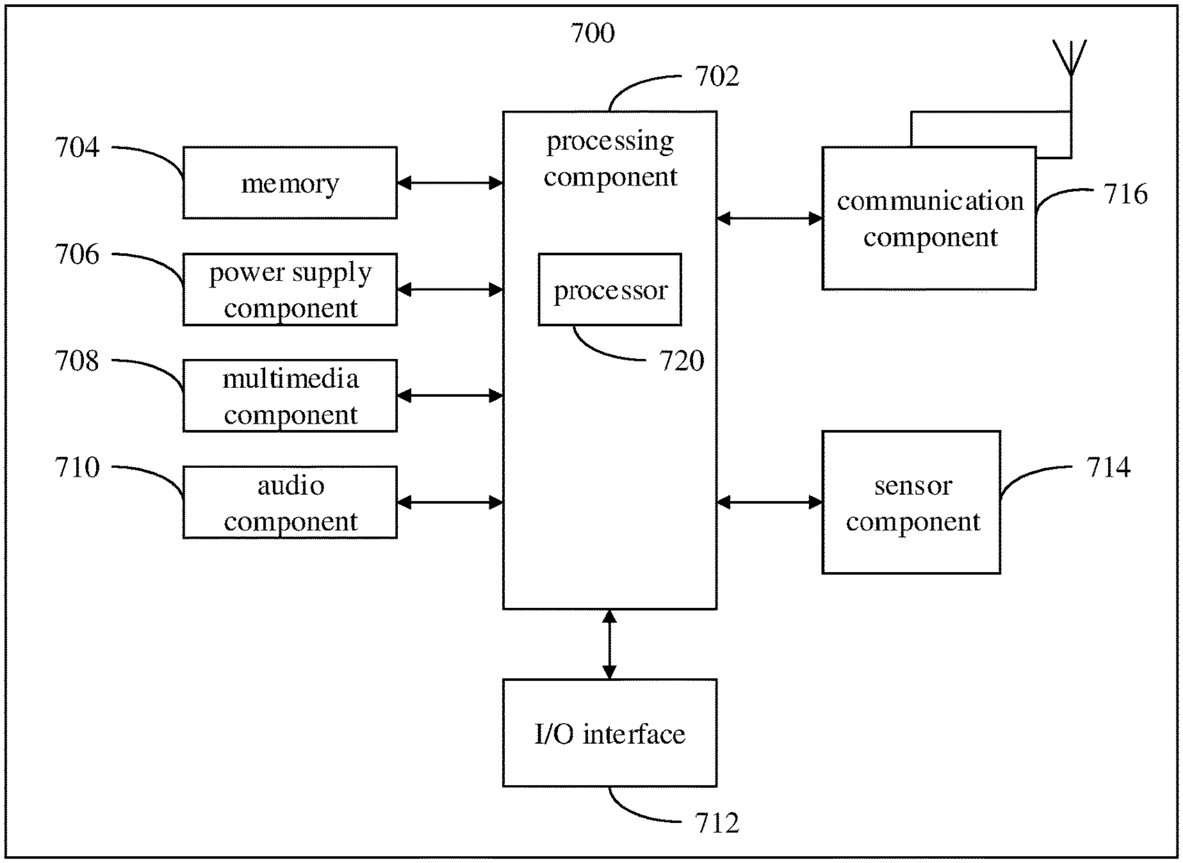
FIG. 7 is a block diagram illustrating a terminal device according to an embodiment of the present disclosure.

FIG. 7 is a block diagram illustrating a user equipment (UE) 700 according to an embodiment of the present disclosure. For example, the UE 700 may be a mobile phone, a computer, a digital broadcasting terminal equipment, a messaging device, a game console, a tablet device, a medical equipment, a fitness equipment, a personal digital assistant, etc.

As illustrated in FIG. 7, the UE 700 may include at least one component: a processing component 702, a memory 704, a power supply component 706, a multimedia component 708, an audio component 710, an input/output (I/O) interface 712, a sensor component 714, and a communication component 716.

The processing component 702 generally controls the whole operation of the UE 700, such as operations related to display, phone call, data communication, camera operation and recording operation. The processing component 702 may include one or more processors 720 to perform instructions, to complete all or part of steps of the above method. In addition, the processing component 702 may include at least one module for the convenience of interaction between the processing component 702 and other components. For example, the processing component 702 may include a multimedia module for the convenience of interaction between the multimedia component 708 and the processing component 702.

The memory 704 is configured to store all types of data to support an operation of the UE 700. Examples of the data include the instructions of any applications or methods operated on the UE 700, contact data, phone book data, messages, pictures, videos, etc. The memory 704 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 706 may provide power supply for all components of the UE 700. The power supply component 706 may include a power supply management system, at least one power supply, and other components related to generating, managing and distributing power for the UE 700.

The multimedia component 708 includes a screen of an output interface provided between the UE 700 and the user. In some embodiments, a screen may include a liquid crystal display (LCD) and a touch panel (TP). When the screen includes a touch panel, the screen may be implemented as a touch screen to receive input signals from the user. The touch panel includes at least one touch sensor to sense touching, sliding and gestures on the touch panel. The touch sensor may not only sense the boundary of touch or slide action, but also detect wakeup time and pressure related to the touching or sliding operation. In some embodiments, the multimedia component 708 includes a front camera and/or a rear camera. When the UE 700 is in operation mode, such as shooting mode or video mode, the front camera or the rear camera may receive external multimedia data. Every front camera and rear camera may be a fixed optical lens system or an optical lens system with focal length and optical zoom capacity.

The audio component 710 is configured as an output and/or input signal. For example, the audio component 710 includes a microphone (MIC). When the UE 700 is in operation mode, such as call mode, record mode, and speech recognition mode, a microphone is configured to receive external audio signals. The audio signals received may be further stored in the memory 704 or sent via the communication component 716. In some embodiments, the audio component 710 further includes a speaker configured to output an audio signal.

The I/O interface 712 provides an interface for the processing component 702 and the peripheral interface module, and the peripheral interface module may be a keyboard, a click wheel, a button, etc. The buttons may include but not limited to a home button, a volume button, a start button and a lock button.

The sensor component 714 includes at least one sensor configured to provide status assessments in all aspects for the UE 700. For example, the sensor component 714 may detect an on/off state of the UE 700 and relative positioning of the component. For example, the component is a display and a keypad of the UE 700. The sensor component 714 may further detect a location change of the UE 700 or one component of the UE 700, presence or absence of contact between the user and the UE 700, an orientation or acceleration/deceleration of the UE 700, and a temperature change of the UE 700. The sensor component 714 may include a proximity sensor, which is configured to detect the existence of the objects nearby without any physical contact. The sensor component 714 may further include a light sensor such as a CMOS or CCD image sensor, which is configured to use in imaging applications. In some embodiments, the sensor component 714 may further include an acceleration transducer, a gyroscope sensor, a magnetic sensor, a pressure sensor or a temperature sensor.

The communication component 716 may be configured for the convenience of wired or wireless communication between the UE 700 and other devices. The UE 700 may access wireless networks based on a communication standard, such as WiFi, 2G or 3G, or their combination. In an exemplary embodiment, the communication component 716 receives broadcast signals or broadcast-related information from an external broadcast management system via a broadcast channel. In an exemplary embodiment, the communication component 716 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In an example embodiment, the UE 700 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronics components, which is configured to perform the above method.

Figure 8:
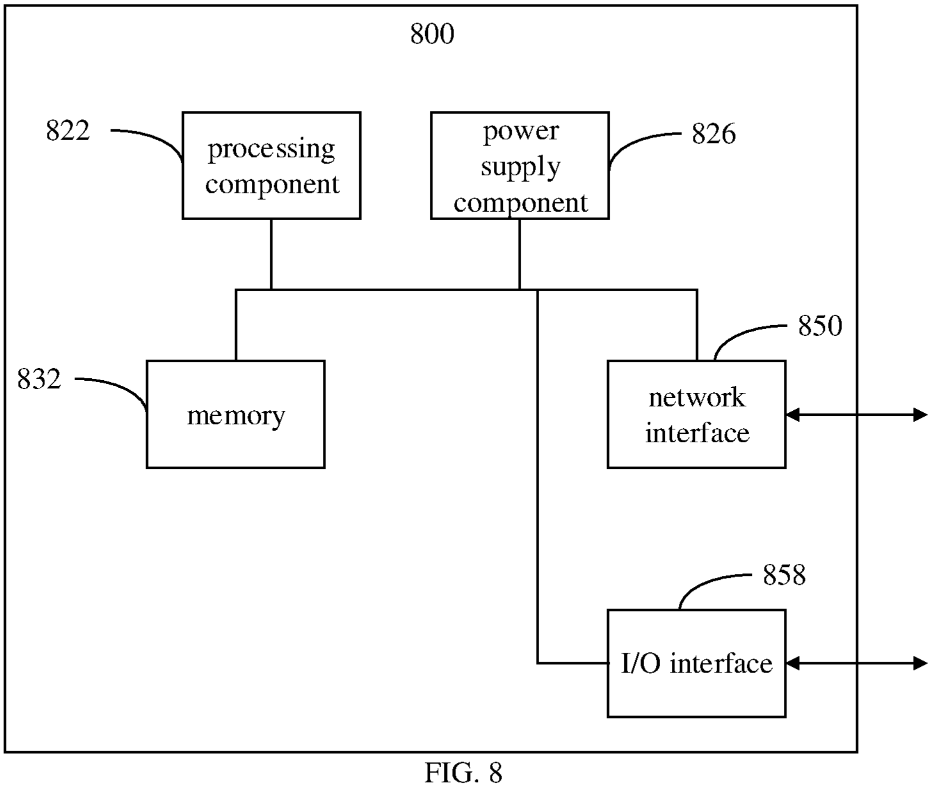
FIG. 8 is a block diagram illustrating a base station according to an embodiment of the present disclosure.

FIG. 8 is a block diagram illustrating a base station 800 according to an embodiment of the present disclosure. For example, the base station 800 may be provided as a base station. As illustrated in FIG. 8, the base station 800 includes a processing component 822, which further includes at least one processor, and memory resources represented by a memory 832, which are configured to store instructions executable by the processing component 822, for example, an application. The application stored in the memory 832 may include one or more modules, each of which corresponds to a set of instructions. In addition, the processing component 822 is configured to execute instructions, to perform any method applicable to the base station as described in the above, for example, the method as illustrated in FIG. 3 or 4.

The base station 800 may further include a power supply component 826 configured to execute power management of the base station 800, a wired or wireless network interface 850 configured to connect the base station 800 to a network, and an input/output (I/O) interface 858. The base station 800 may operate an operating system stored in the memory 832, for example, Windows Server™, Mac OS X™, Unix™, Linux™, FreeBSD™ or similar.

After considering the specification and practicing the present disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of embodiments in the present disclosure are given by the appended claims.

It should be understood that the present disclosure is not limited to the precise structure described above and shown in the drawings, and various modifications and changes may be made without departing from its scope. The scope of the present disclosure is only limited by the appended claims.

What is claimed is:

1. A method for indicating a multicast broadcast service (MBS), performed by a terminal device, the method comprising:

receiving a radio resource control (RRC) signaling sent by a network device, and acquiring at least one group radio network temporary identifier (G-RNTI) for the terminal device and at least one subgroup identifier (ID) corresponding to the terminal device according to the RRC signaling, wherein the at least one G-RNTI is configured to identify an MBS group to which the terminal device belongs, each of the at least one subgroup ID is configured to identify an MBS subgroup to which the terminal belongs, wherein the MBS subgroup belongs to the MBS group;

acquiring downlink control information (DCI), and determining subgroup indication information according to the DCI, wherein the subgroup indication information indicates a target subgroup ID; and determining a physical downlink shared channel (PDSCH) scheduled by the DCI that needs to be parsed according to the at least one subgroup ID and the subgroup indication information, wherein the PDSCH is configured to carry the MBS.

2. The method according to claim 1, wherein the DCI is carried by a physical downlink control channel (PDCCH), and the DCI comprises the subgroup indication information.

3. The method according to claim 2, wherein the subgroup indication information is located in at least one of:

a newly added information field in the DCI;

a refarmed information field in the DCI; or a frozen bit comprised in coded bits of the DCI.

4. The method according to claim 1, wherein determining the PDSCH scheduled by the DCI that needs to be parsed according to the at least one subgroup ID corresponding to the terminal device and the subgroup indication information comprises:

receiving the DCI comprising the subgroup indication information, and determining the target subgroup ID according to the subgroup indication information comprised in the DCI; and in response to the terminal device belonging to a target subgroup corresponding to the target subgroup ID, determining to parse the PDSCH scheduled by the DCI according to scheduling information in the DCI.

5. The method according to claim 1, further comprising:

determining a scrambling sequence used for the PDSCH scheduled by the DCI according to subgroup indication information carried in the DCI; or determining a scrambling ID used for scrambling the PDSCH via an RRC signaling sent by a network device, and determining a scrambling sequence according to the scrambling ID.

6. A method for indicating a multicast broadcast service (MBS), performed by a network device, comprising:

configuring for a terminal device, via a radio resource control (RRC) signaling, at least one group radio network temporary identifier (G-RNTI) and at least one subgroup identifier (ID) corresponding to the terminal device, wherein the at least one G-RNTI is configured to identify an MBS group to which the terminal device belongs, each of the at least one subgroup ID is configured to identify an MBS subgroup to which the terminal belongs, wherein the MBS subgroup belongs to the MBS group; and sending subgroup indication information to the terminal device via downlink control information (DCI), wherein the subgroup indication information is configured to indicate, by indicating a target subgroup ID, to the terminal device a subgroup corresponding to a physical downlink shared channel (PDSCH) scheduled by the DCI.

7. The method according to claim 6, wherein the subgroup indication information is carried in at least one of:

a newly added information field in the DCI;

a refarmed information field in the DCI; or a frozen bit comprised in coded bits of the DCI.

8. The method according to claim 6, wherein sending the subgroup indication information to the terminal device via the DCI comprises:

sending the DCI comprising the subgroup indication information, and indicating the target subgroup ID to the terminal device according to the subgroup indication information comprised in the DCI; and sending a PDSCH corresponding to a target subgroup according to scheduling information carried in the DCI.

9. The method according to claim 6, further comprising:

configuring a scrambling ID for the PDSCH corresponding to the subgroup; or configuring a scrambling ID used for the PDSCH corresponding to the subgroup for the terminal device via an RRC signaling, and generating a scrambling sequence according to the scrambling ID to scramble the PDSCH.

10. A terminal device, comprising:

a transceiver;

a memory; and a processor respectively connected to the transceiver and the memory, wherein the processor is configured to:

receive a radio resource control (RRC) signaling sent by a network device, and acquire at least one group radio network temporary identifier (G-RNTI) for the terminal device and at least one subgroup identifier (ID) corresponding to the terminal device according to the RRC signaling, wherein the at least one G-RNTI is configured to identify an MBS group to which the terminal device belongs, each of the at least one subgroup ID is configured to identify an MBS subgroup to which the terminal belongs, wherein the MBS subgroup belongs to the MBS group;

acquire downlink control information (DCI), and determine subgroup indication information according to the DCI, wherein the subgroup indication information indicates a target subgroup ID; and determine a physical downlink shared channel (PDSCH) scheduled by the DCI that needs to be parsed according to at least one subgroup ID and the subgroup indication information, wherein the PDSCH is configured to carry the MBS.

11. The terminal device according to claim 10, wherein the DCI is carried by a physical downlink control channel (PDCCH), and the DCI comprises the subgroup indication information.

12. The terminal device according to claim 11, wherein subgroup indication information is located in at least one of:

a newly added information field in the DCI;

a refarmed information field in the DCI; or a frozen bit comprised in coded bits of the DCI.

13. The terminal device according to claim 10, wherein the processor is further configured to:

receive the DCI comprising the subgroup indication information, and determine the target subgroup ID according to the subgroup indication information comprised in the DCI; and in response to the terminal device belonging to a target subgroup corresponding to the target subgroup ID, determine to parse the PDSCH scheduled by the DCI according to scheduling information in the DCI.

14. The terminal device according to claim 10, wherein the processor is further configured to:

determine a scrambling sequence used for the PDSCH scheduled by the DCI according to subgroup indication information carried in the DCI; or determine a scrambling ID used for scrambling the PDSCH via an RRC signaling sent by a network device, and determine a scrambling sequence according to the scrambling ID.

* * * * *